(12) United States Patent
Hiroki et al.

(10) Patent No.: US 7,625,130 B2
(45) Date of Patent: Dec. 1, 2009

(54) OPTICAL COMPONENT AND ADAPTER INCLUDING THE SAME

(75) Inventors: Yasutaka Hiroki, Tokyo (JP); Yuichi Koreeda, Tokyo (JP); Naoki Katagiyama, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 17 days.

(21) Appl. No.: 12/145,788

(22) Filed: Jun. 25, 2008

(65) Prior Publication Data

US 2009/0003775 A1 Jan. 1, 2009

(30) Foreign Application Priority Data

Jun. 29, 2007 (JP) .............................. 2007-171990

(51) Int. Cl.
*G02B 6/36* (2006.01)
*G02B 6/38* (2006.01)

(52) U.S. Cl. .............................. 385/84; 385/55; 385/58; 385/60; 385/66; 385/69; 385/75; 385/78; 385/86; 385/87

(58) Field of Classification Search ................... 385/69, 385/78, 84, 86, 87
See application file for complete search history.

(56) References Cited

U.S. PATENT DOCUMENTS

| 5,781,674 | A  | * | 7/1998 | Asai | ............................. | 385/78  |
| 7,192,194 | B2 | * | 3/2007 | Giotto et al. | .................. | 385/53  |
| 7,215,868 | B2 | * | 5/2007 | Shimazu et al. | ............. | 385/137 |

FOREIGN PATENT DOCUMENTS

JP 10-39145 A 2/1998

* cited by examiner

*Primary Examiner*—Ryan Lepisto
(74) *Attorney, Agent, or Firm*—Frishauf, Holtz, Goodman & Chick, P.C.

(57) ABSTRACT

An optical component is improved in workability during assembly operation thereof and makes it possible to easily position an optical fiber. A first ferrule is press-fitted into one end of a central hole of a connecting member, and a second ferrule is press-fitted into the other end of the central hole of the connecting member. An optical fiber is inserted through the first and second ferrules. A coating which coats an intermediate portion of the optical fiber of an optical fiber cord is accommodated in a communicating portion of the central hole of the connecting member in a manner such that the coating is brought into abutment with the first and second ferrules.

4 Claims, 5 Drawing Sheets

OPTICAL COMPONENT AND ADAPTER INCLUDING THE SAME

BACKGROUND OF THE INVENTION

1. Field of the Invention

This invention relates to an optical component and an adapter including the same, and more particularly to an optical component used in the fields of communications and the like, and an adapter including the same.

2. Description of the Related Art

Conventionally, there has been proposed an optical attenuator which is comprised of a plastic flange, a first zirconia ferrule, a second zirconia ferrule, and an attenuating optical fiber (see Japanese Laid-Open Patent Publication (Kokai) No. H10-39145 (paragraphs [0032] to [0034] and FIG. 1).

The plastic flange has a hole formed in a central portion of the plastic flange.

The first zirconia ferrule is inserted into one end of the hole of the plastic flange.

The second zirconia ferrule is inserted into the other end of the hole of the plastic flange.

An optical fiber is inserted through the first and second zirconia ferrules fitted in the plastic flange.

To assemble the optical attenuator, first, the first zirconia ferrule is press-fitted into the one end of the hole of the plastic flange, and the second zirconia ferrule is press-fitted into the other end of the hole of the plastic flange.

Next, the optical fiber is inserted through the first and second zirconia ferrules.

After that, the optical fiber is fixed to the first and second zirconia ferrules with an adhesive.

Finally, the end faces of the first and second zirconia ferrules are Advanced-PC-polished.

Although in the above-described optical attenuator, an uncoated optical fiber is normally used, it is impossible to use tweezers to assemble the optical attenuator since there is a fear of damaging the optical fiber by the tweezers. Therefore, it was necessary to pick up the optical fiber directly with fingers to assemble the same.

However, the optical fiber is difficult to pick up with fingers, so that it has been impossible to easily insert the optical fiber through the first and second zirconia ferrules.

Further, when the optical fiber is inserted through the second zirconia ferrule after it is inserted through the first zirconia ferrule, the optical fiber is axially displaced, and hence it is difficult to position the optical fiber with respect to the first and second zirconia ferrules. Therefore, to position the optical fiber, the optical fiber was caused to slide many times, which sometimes damages the surface of the optical fiber.

SUMMARY OF THE INVENTION

The present invention has been made in view of these circumstances, and an object thereof is to provide an optical component which is improved in workability during assembly operation thereof and makes it possible to easily position an optical fiber, and an adapter including the optical component.

To attain the above object, in a first aspect of the present invention, there is provided an optical component comprising a connecting member having a hole, a first ferrule that is inserted into one end of the hole of the connecting member, a second ferrule that is inserted into the other end of the hole of the connecting member, and an optical fiber that is inserted into the first and second ferrules, and a coated portion that is located at an approximately intermediate portion of the optical fiber and is accommodated in an approximately intermediate portion of the hole such that the coated portion is brought into abutment with at least one of the first and second ferrules.

With the arrangement of the optical component according to the first aspect of the present invention, the coated portion is provided on the optical fiber, so that it is possible to pick up the optical fiber with tweezers. Further, the coated portion of the optical fiber is accommodated in the hole of the connecting member such that it is brought into abutment with at least one of the first and second ferrules, and hence the core is positioned with respect to the first and second ferrules.

According to the optical component according to the first aspect of the present invention, it is possible to improve workability during assembly of the optical component and easily position the optical fiber.

Preferably, the connecting member has at least one through hole extending from the intermediate portion of the hole to a space outside the connecting member.

Preferably, an inner diameter of the intermediate portion of the hole is made smaller than inner diameters of opposite ends of the hole.

Preferably, tapered portions are formed at respective ends of the first and second ferrules toward the coated portion.

To attain the above object, in a second aspect of the present invention, there is provided an adapter for fitting connectors to each other, comprising an optical component including a connecting member having a hole, a first ferrule that is inserted into one end of the hole of the connecting member, a second ferrule that is inserted into the other end of the hole of the connecting member, and an optical fiber inserted into the first and second ferrules, and a coated portion that is located at an approximately intermediate portion of the optical fiber and is accommodated in an approximately intermediate portion of the hole such that the coated portion is brought into abutment with at least one of the first and second ferrules, and a housing for holding the optical component.

According to the adapter according to the second aspect of the present invention, it is possible to obtain the same advantageous effects as provided by the first aspect of the present invention.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
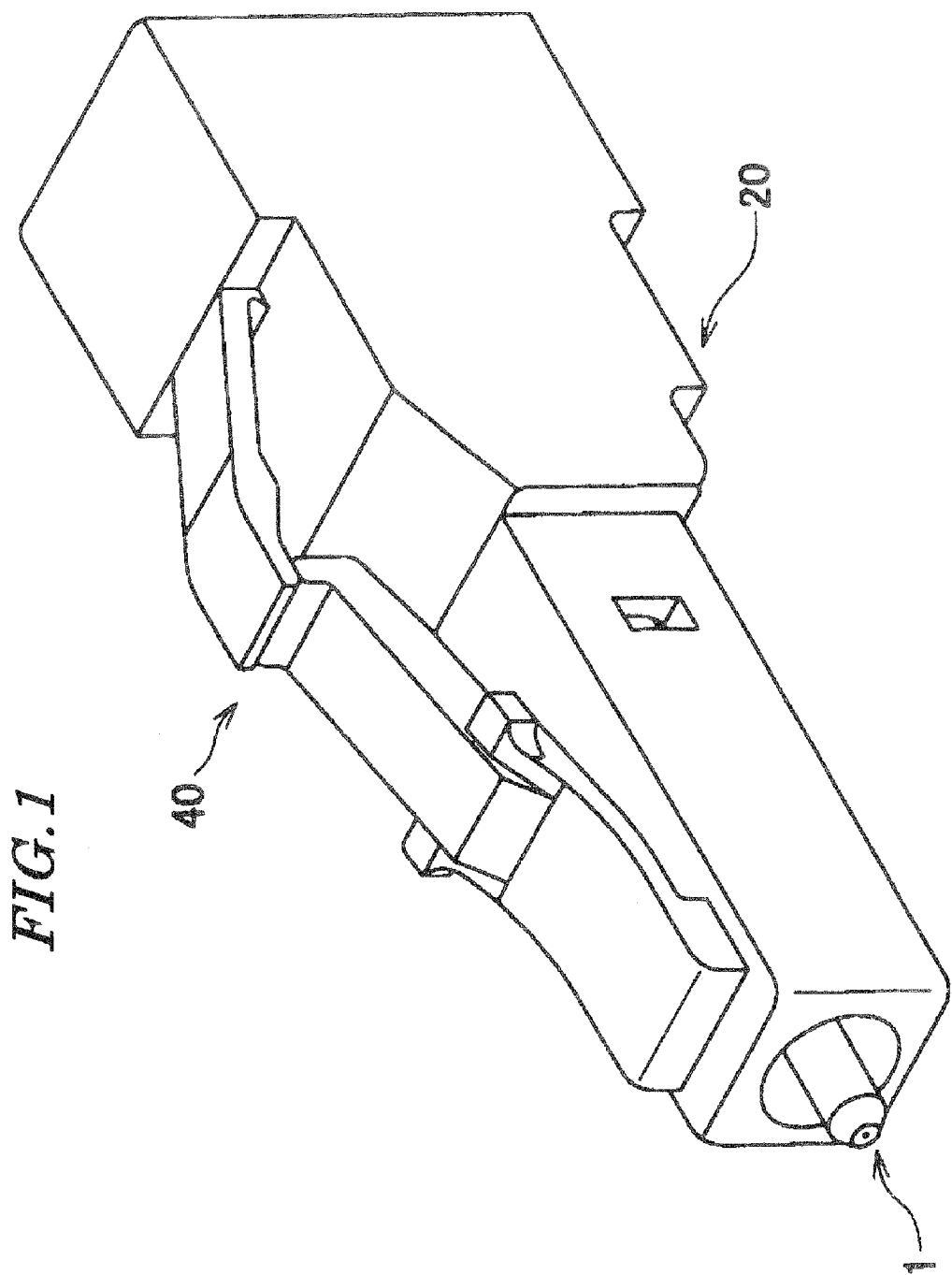
FIG. 1 is a perspective view of an adapter including an optical component according to an embodiment of the present invention.
Figure 2:
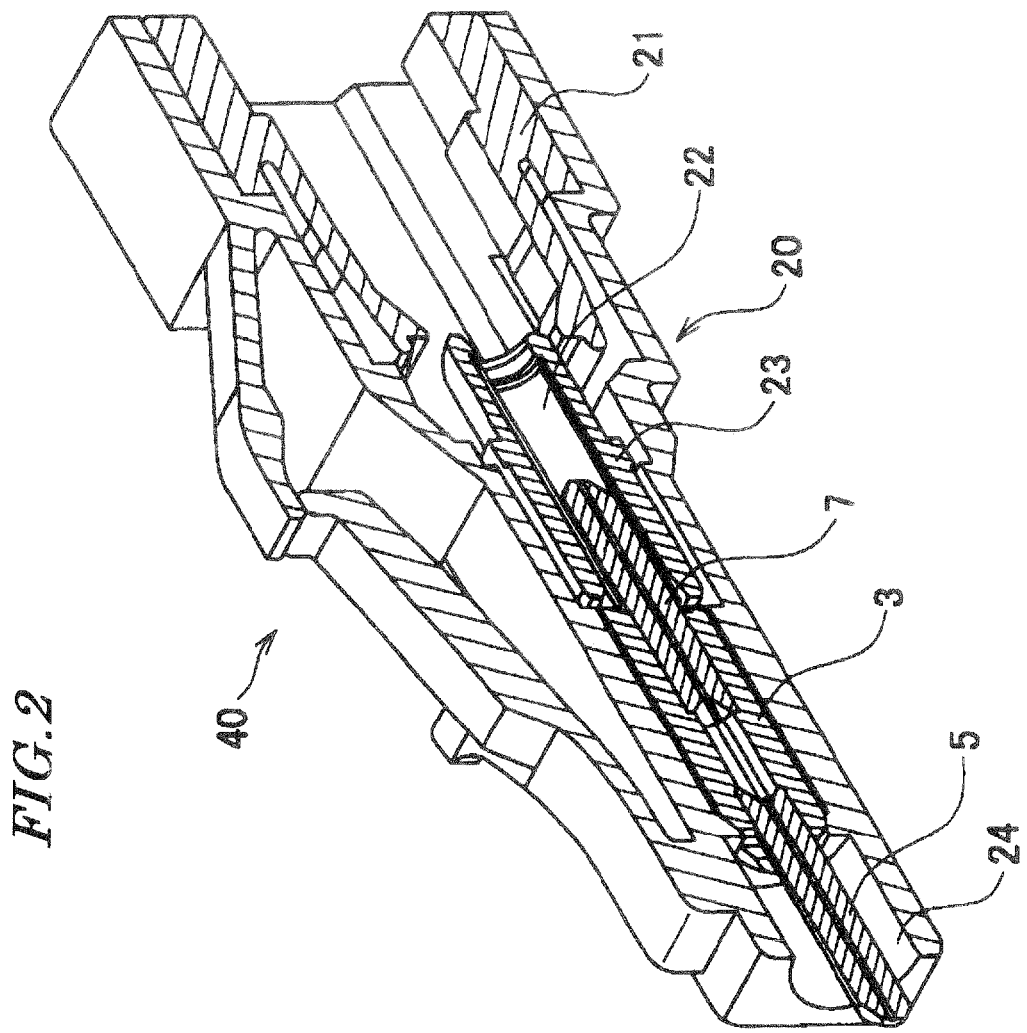
FIG. 2 is a cross-sectional view of the adapter shown in FIG. 1.

Referring to FIGS. 1 and 2, reference numeral 40 denotes an adapter including an optical component according to an embodiment of the present invention. The adapter 40 is comprised of a housing 20 and the optical component 1.

The housing 20 has one end accommodating a locking member 21 for locking an MU connector (Miniature Unit connector), not shown.

A central portion of the housing 20 accommodates a split sleeve holder 23 for holding a split sleeve 22 necessary for connection to the MU connector. One end of the optical component 1 is inserted into the split sleeve 22.

The other end of the housing 20 is formed with a fitting portion 24 that is fitted to an LC connector (Lucent connector), not shown.

Figure 3:
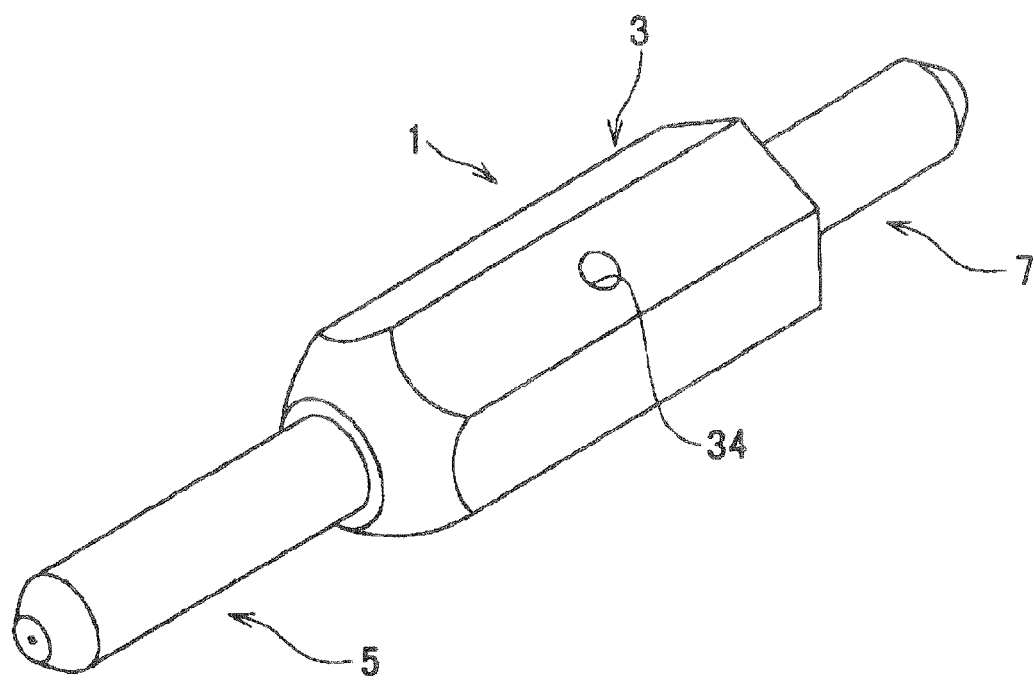
FIG. 3 is a perspective view of the optical component appearing in FIG. 1.
Figure 4:
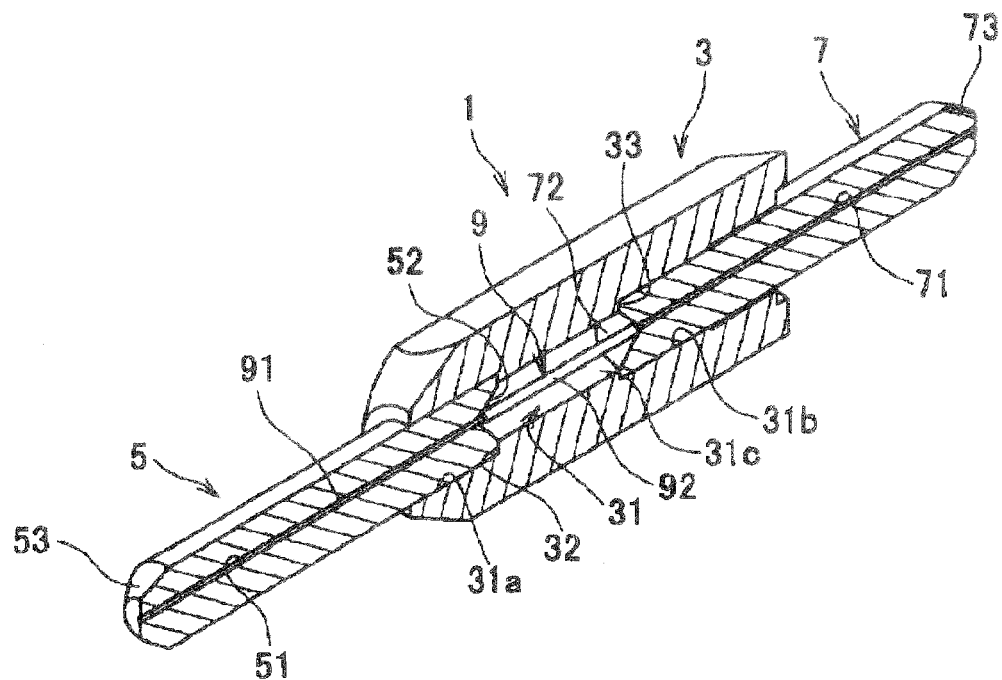
FIG. 4 is a cross-sectional view of the FIG. 3 optical component.

Referring to FIGS. 3 and 4, the optical component 1 is comprised of a connecting member 3, a first ferrule 5, and a second ferrule 7, and an optical fiber cord 9.

The connecting member 3 has a generally hexagonal columnar shape, and includes a central hole (hole) 31. The central hole 31 extends along the central axis of the connecting member 3. The central hole 31 is comprised of a first insertion portion 31a located at one end of the central hole 31, a second insertion portion 31b located at the other end of the central hole 31, and a communicating portion 31c located at the intermediate portion of the central hole 31. The communicating portion 31c causes the first insertion portion 31a and the second insertion portion 31b to communicate with each other. The inner diameter of the first insertion portion 31a is equal to that of the second insertion portion 31b. The inner diameter of the communicating portion 31c is smaller than that of the first and second insertion portions 31a and 31b. Therefore, riser surfaces 32 and 33 are formed between the communicating portion 31c and the first insertion portion 31a, and between the communicating portion 31c and the second insertion portion 31b, respectively.

Further, the connecting member 3 is formed with a through hole 34. The through hole 34 communicates with the outer space via the communicating portion 31c of the central hole 31.

The first ferrule 5 is generally cylindrical, and has an optical fiber insertion hole 51. The optical fiber insertion hole 51 extends along the center line of the first ferrule 5. One end (end toward a coated portion) of the first ferrule 5 is formed with a female tapered portion 52, and the other end thereof formed with a male tapered portion 53.

The one end of the first ferrule 5 is inserted into the first insertion portion 31a of the connecting member 3.

The second ferrule 7 is generally cylindrical, and has an optical fiber insertion hole 71. The optical fiber insertion hole 71 extends along the center line of the second ferrule 7. One end (end toward the coated portion) of the second ferrule 7 is formed with a female tapered portion 72, and the other end thereof formed with a male tapered portion 73.

The one end of the second ferrule 7 is inserted into the second insertion portion 31b of the connecting member 3.

The optical fiber cord 9 includes an optical fiber 91 and a coating 92. The optical fiber 91 is inserted through the optical fiber insertion hole 51 of the first ferrule 5 and the optical fiber insertion hole 71 of the second ferrule 7.

The coating 92 coats an approximately intermediate portion of the optical fiber 91. The coating 92 is accommodated in the communicating portion 31c of the central hole 31 of the connecting member 3 in a manner such that it is sandwiched between the first and second ferrules 5 and 7. The length of the coating 92 is approximately equal to the distance from the central portion of the tapered portion 52 to the central portion of the tapered portion 72 in a state in which the first and second ferrules 5 and 7 are fitted in the connecting member 3. Further, the length from one end of the coating 92 to one end face of the optical fiber 91 is approximately equal to the length of the optical fiber insertion hole 51 of the first ferrule 5, and the length from the other end of the coating 92 to the other end face of the optical fiber 91 is approximately equal to the length of the optical fiber insertion hole 71 of the second ferrule 7.

The outer diameter of the coating 92 is larger than the inner diameter of the optical fiber insertion holes 51 and 71. The inner diameter of the optical fiber insertion hole 51 is equal to that of the optical fiber insertion hole 71.

Figure 5:
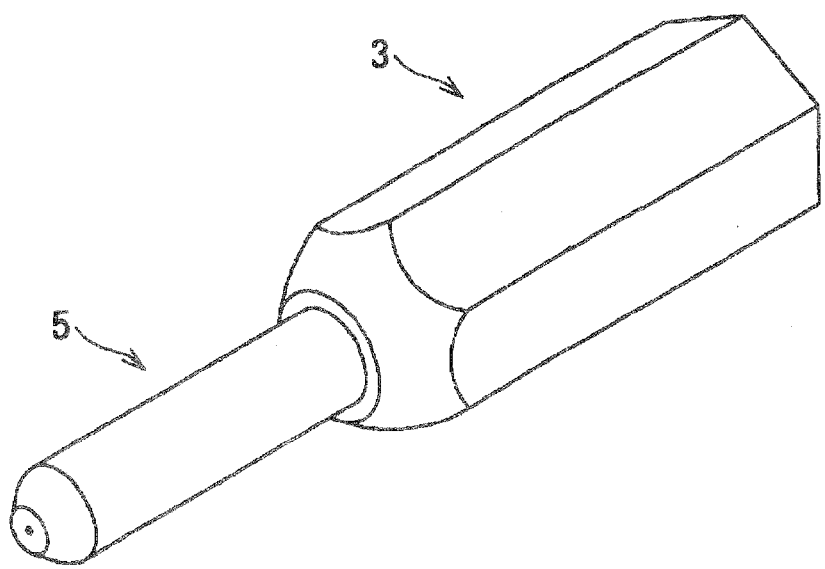
FIG. 5 is a perspective view of a connecting member and a first ferrule of the FIG. 4 optical component, in a state in which the first ferrule is press-fitted in the connecting member.

Next, a procedure of assembling the optical component 1 will be described with reference to FIGS. 5 to 7.

The coating of the optical fiber cord 9 is removed over a predetermined length in advance before the optical component 1 is assembled. At this time, the coating of the central portion of the optical fiber cord 9 is left unremoved over a predetermined length as the coating 92.

First, an adhesive, not shown, is filled in the optical fiber insertion hole 51 of the first ferrule 5, whereafter one end of the first ferrule 5 is press-fitted into the first insertion portion 31a (see FIGS. 4 and 5) of the central hole 31 of the connecting member 3.

Next, the adhesive is filled in the communicating portion 31c of the central hole 31 of the connecting member 3 via the second insertion portion 31b of the connecting member 3.

Figure 6:
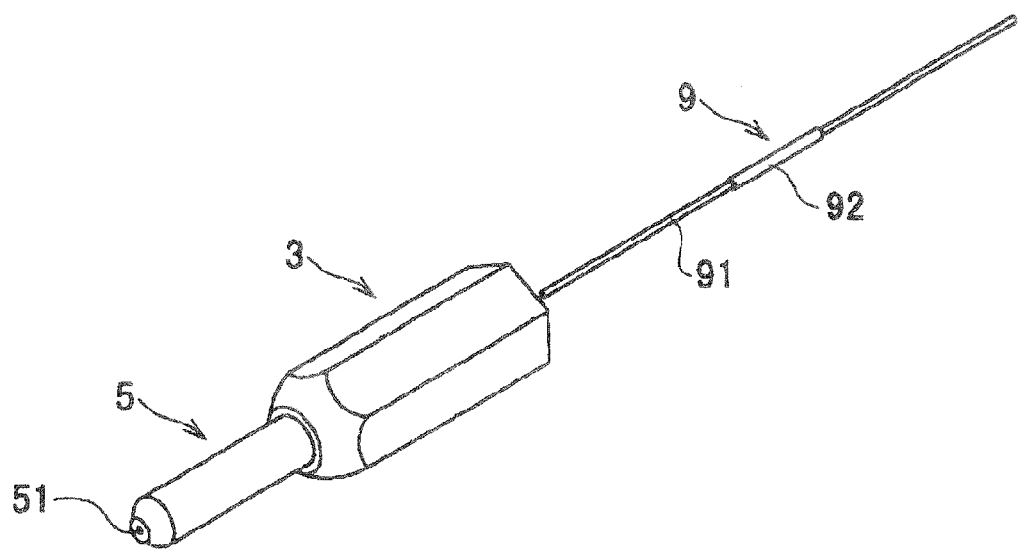
FIG. 6 is a perspective view of the first ferrule of the FIG. 4 optical component and an optical fiber in a state before the optical fiber is inserted through the first ferrule.
Figure 7:
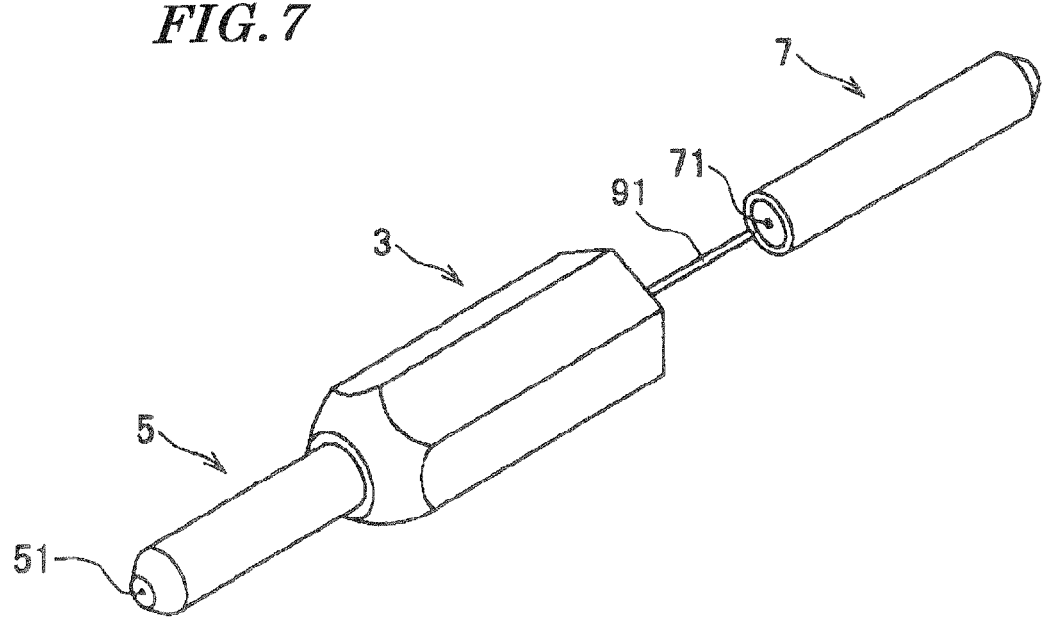
FIG. 7 is a perspective view of second ferrule of the FIG. 4 optical component and the optical fiber in a state before the optical fiber is inserted through the second ferrule.

Then, the coating 92 of the optical fiber cord 9 is picked up e.g. with tweezers, and as shown in FIGS. 6 and 7, one end of the optical fiber 91 is inserted through the optical fiber insertion hole 51 of the first ferrule 5. The one end of the optical fiber 91 is inserted into the optical fiber insertion hole 51 until the coating 92 is brought into abutment with the first ferrule 5. As a result, the one end of the optical fiber 91 is accurately positioned with respect to the first ferrule 5, and the end face of the one end of the optical fiber 91 and the end face of the first ferrule 5 substantially coincide with each other.

Next, the adhesive, not shown, is filled in the optical fiber insertion hole 71 of the second ferrule 7, and the other end of the optical fiber 91 is inserted into the optical fiber insertion hole 71 of the second ferrule 7, and one end of the second ferrule 7 is press-fitted into the second insertion portion 31b (see FIG. 4) of the central hole 31 of the connecting member 3 (see FIG. 7).

Finally, when the adhesive is cured to rigidly fix the optical fiber 91 to the first and second ferrules 5 and 7, the opposite end faces of the optical fiber 91 are mirror finished together with the associated end faces of the first and second ferrules 5 and 7.

According to the present embodiment, it is possible not only to easily assemble the optical component but also to accurately and easily position the optical fiber 91 with respect to the first and second ferrules 5 and 7.

Further, the riser surfaces 32 and 33 make it possible to accurately and easily position the first and second ferrules 5 and 7 with respect to the connecting member 3. Further, it is possible to hold constant the amount of insertion of the first and second ferrules 5 and 7 into the central hole 31 of the connecting member 3.

Furthermore, when the adhesive is filled in the connecting member 3, air within the central hole 31 is discharged via the through hole 34, so that it is possible to supply completely fill the communicating portion 31c with the adhesive. Further, during assembly of the optical component, an extra amount of adhesive within the central hole 31 can be discharged from the connecting member 3 via the through hole 34.

Further, when the optical fiber 91 is inserted through the optical fiber insertion holes 51 and 71 of the respective first and second ferrules 5 and 7, the tapered portions 52 and 72 of the first and second ferrules 5 and 7 guide the optical fiber 91 into the optical fiber insertion holes 51 and 71, whereby it is possible to easily insert the optical fiber 91 into the first and second ferrules 5 and 7.

Furthermore, although the prior art necessitates a step of cutting the opposite ends of the optical fiber 91 before mirror finishing the optical fiber, in the present embodiment, the coating 92 makes it possible to accurately position the optical fiber 91 with respect to the first and second ferrules 5 and 7. This makes it possible to omit the step of cutting the opposite ends of the optical fiber 91.

It should be noted that although in the present embodiment, the first and second ferrules 5 and 7 are configured to be press-fitted into the connecting member 3, this is not limitative, but they may be configured to be bonded to the connecting member 3.

Further, although in the present embodiment, the optical component is applied to the adapter, this is not limitative, but the optical component according to the present invention may also be used e.g. as an optical attenuator.

It should be noted that the position, the number, and the like of the through hole 34 can be modified variously but not be particularly limited.

It is further understood by those skilled in the art that the foregoing are the preferred embodiments of the present invention, and that various changes and modification may be made thereto without departing from the spirit and scope thereof.

What is claimed is:

1. An optical component comprising:
   a connecting member having a hole;
   a first ferrule that is inserted into one end of the hole of said connecting member;
   a second ferrule that is inserted into the other end of the hole of said connecting member; and
   an optical fiber cord including an optical fiber that is inserted into said first and second ferrules, and a coating portion that is located at an approximately intermediate portion of said optical fiber and is accommodated in an approximately intermediate portion of the hole such that said coating portion is brought into abutment with at least one of said first and second ferrules;
   wherein an inner diameter of the intermediate portion of the hole is smaller than inner diameters of opposite ends of the hole.

2. An optical component as claimed in claim 1, wherein said connecting member has at least one through hole extending from the intermediate portion of the hole to a space outside said connecting member.

3. An optical component as claimed in claim 1, wherein said first and second ferrules have tapered portions at respective ends thereof that are adjacent to said coating portion.

4. An adapter for fitting connectors to each other, comprising:
   (i) an optical component including:
      a connecting member having a hole;
      a first ferrule that is inserted into one end of the hole of said connecting member;
      a second ferrule that is inserted into the other end of the hole of said connecting member; and
      an optical fiber cord including an optical fiber that is inserted into said first and second ferrules, and a coating portion that is located at an approximately intermediate portion of said optical fiber and is accommodated in an approximately intermediate portion of the hole such that said coating portion is brought into abutment with at least one of said first and second ferrules;
      wherein an inner diameter of the intermediate portion of the hole is smaller than inner diameters of opposite ends of the hole; and
   (ii) a housing for holding said optical component.

* * * * *